April 28, 1970 E. A. GUILLEMIN 3,509,482

ACTIVE FILTER NETWORKS

Original Filed April 27, 1966 2 Sheets-Sheet 1

ERNST A. GUILLEMIN

INVENTOR.

BY Ralph L. Cadwallader

Leo McKelly

ATTORNEYS

ERNST A. GUILLEMIN
INVENTOR.
BY Ralph L. Cadwallader
Leo M Kelly
ATTORNEYS

United States Patent Office 3,509,482

Patented Apr. 28, 1970

3,509,482

ACTIVE FILTER NETWORKS

Ernst A. Guillemin, Wellesley, Mass., assignor, by mesne assignments, to EG & G, Inc., Bedford, Mass., a corporation of Massachusetts Continuation of application Ser. No. 545,631, Apr. 27, 1966. This application Jan. 21, 1969, Ser. No. 796,290

Int. Cl. H03f *1/36*

U.S. Cl. 330—107 23 Claims

ABSTRACT OF THE DISCLOSURE

An active filter network is provided including an operational amplifier having a feedback circuit including a resistance-capacitance ladder network having a transfer function whose real part has a negative minimum at a particular frequency and a non-zero imaginary part at the particular frequency and a separate resistance-capacitance circuit couplied to the network for raising the negative minimum to zero and cancelling the imaginary part to zero.

This application is a continuation of Ser. No. 545,631, filed Apr. 27, 1966, now abandoned.

This invention relates to filter networks and more particularly to active filter networks.

Active filters are a combination of an amplifier and a passive resistance-capacitance network. The principles of active filters have been known for a number of years. Detailed background information and additional references may be found in two papers by I. M. Horowitz, "Optimization of Negative Impedance Converter Synthesis Techniques," Trans. IRE CT–6, 1959, and "Transistor RC Band-Pass Filter Design," Trans. IRE CT–7, September 1960; and "A Practical Method of Designing RC Active Filters" by Sallen and Key, trans. IRE CT–2, 1955.

Active filters have been finding increased use as the state-of-the-art of the components continues to improve. Principal applications have been in precision instruments such as audio wave analysis, speech octave-band analyzers, telephone ringing equipment, telemetry equipment and most recently in computer circuitry.

Some of the problems faced by prior-art active filters which have limited their acceptance in the electronic design field, have been the instability of the network in environments of changing temperature, shock or vibration and dynamic signal versus frequency ranges. The size of the units, the cost necessitated by highly acucrate components, and requirement that each such network had to be individually designed, were all factors that restricted the use of active filters to specific applications.

A prime object of this invention is to provide an active filter network which is not subject to the aforementioned disadvantages.

Another object of this invention is to provide a network of fixed components with external means for finely adjusting its characteristic response.

A further object is to provide a network which may employ production-quality components rather than the much more expensive, high-precision components.

Still another object is to provide a network that is readily adaptable to subminiaturization without decreasing its functional advantages.

In summary, this invention resides in a passive RC network in combination with a high-gain amplifier. The passive network being comprised of a plurality of resistors and capacitors in a permanent arrangement with external resistance and capacitance for tuning the network to desired operating frequencies.

Other and further objects will be hereinafter pointed out in the following specifications and particularly in the appended claims.

This invention will be better understood by reference to the attached drawings in which.

Figure 1:
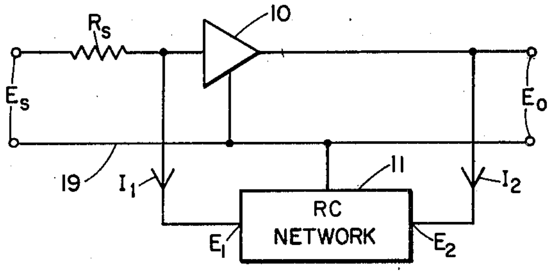
FIGURE 1 is a schematic drawing of a basic circuit for an active filter network.

A network is characterized externally in terms of the voltage and currents at its accessible terminal pairs. In most situations only the ratios between these quantities taken in pairs are of interest as, for example, the ratio of a voltage to a current at a given terminal pair, or the voltage at one terminal pair to the current at another. If the ratio is a voltage to a current, it is called an impedance; if a current to a voltage, it is designated an admittance. If both quantities in the ratio pertain to the same terminal pair, it is called a driving point impedance or admittance, but if the voltage is at one terminal pair and the current at another, then we speak of a transfer impedance or admittance. We can also be interested in the ratio of a voltage to a voltage or a current to a current. Such dimensionless ratios, to be non-trivial, must obviously be transfer quantities. In any case, they can be expressed as a ratio of impedances or of admittances.

Analytically, these characterizing functions take the form of a quotient of finite polynomials in a variable $s$ called the complex frequency variable. A thorough treatment of these functions may be found in the applicant's texts on this subject, "Introductory Circuit Theory" and "Synthesis of Passive Networks," published by John Wiley and Sons, New York, N.Y. in 1953 and 1957 respectively. Special attention is directed to chapter 13 of the later book for a fuller explanation of the analysis relating to RC networks. The mathematical name for these characterizing functions is "rational functions." If they pertain to a network made of passive resistances, inductances and capacitances, then they are a very particular kind of rational functions; and if the network contains only resistances and capacitances, they are an even more particular kind of rational function. These functions are traditionally expressed in the form of polynomials with particular emphasis upon the zeros thereof. The zeros of a driving-point impedance imply that the terminal pair to which the voltage pertains is a short circuit. The zeros of a driving-point admittance imply an open circuit. For the zeros of impedance, the admittance is infinite and the impedance is infinite for zeros of admittance.

The zeros of a driving point impedance are the natural frequencies of the pertinent network for a short circuit constraint placed at the terminal pair in question. More specifically, these are referred to as short circuit natural frequencies. When several terminal pairs are involved, we have several sets of short circuit natural frequencies. Similarly, the zeros of admittances may be interpreted as open circuit natural frequencies and there are as many of these sets as there are terminal pairs.

By natural frequencies we mean those that the network exhibits when left to its own devices as it would be if it were given an impulse and then left to respond freely with no external influence. Natural frequencies are also called characteristic frequencies because they characterize the network behavior when isolated from all external disturbances.

Although poles of a transfer function have the same physical connotation as those of a driving point function, their zeros have an altogether different significance. The zeros of a transfer function are frequencies for which we get no output in spite of an applied input. For this reason, they are also designated as zeros of transmission.

By the location of natural frequencies in the complex plane (more specifically referred to as the $s$-plane) we can recognize the character of the network's behavior pattern. Thus for a passive network all natural frequencies must lie in the left half-plane or on the $j$-axis. If a network had poles or natural frequencies in the right half-plane, it would be unstable. All zeros and poles of passive driving point functions must be in the left half-plane.

In networks which contain only resistors and capacitors it can be shown that all zeros and poles of driving point functions and all poles of transfer functions must lie upon the negative real axis. That is to say, they cannot be complex. They must lie in the left half-plane (like all natural frequencies) but, more than that, they are restricted to be real; they are negative real. They must be distinct. These distinct zeros and poles must alternate or be interlaced on the negative real axis. If the function is an impedance, then the critical frequency nearest the origin of the $s$-plane must be a pole; for an admittance it must be a zero.

Referring now to FIGURE 1, a basic circuit for an active filter is shown. The active element is operational amplifier 10 connected in a negative feedback arrangement with passive RC network 11. $E_s$ and $E_o$ represent the input and output voltages respectively while $E_1$ and $E_2$ are potentials at the network terminals. All voltages are referenced to the potential of line 19 which is, for example, ground, but may be any predetermined reference potential. For convenience, the currents at the network terminals are shown as $I_1$ and $I_2$ and the arrows indicate the reference directions. Resistor $R_s$ represents the internal resistance of voltage source $E_s$. To better understand the invention, the network of FIGURE 2 is employed for RC network 11.

The portion of the circuit within the dotted lines 12 is a symmetrical but unbalanced ladder network and, by holding the values of each resistor R and each capacitor C constant, a transfer admittance having a $j$-axis zero can be obtained by bridging the network with a resistor $R_o$ and capacitor $C_o$ having appropriate values. We can show that increasing $R_o$ shifts the transmission zero into the right half-plane and decreasing $R_o$ shifts into the left half-plane. Similarly, it can be shown that increasing $C_o$ shifts the transmission zero to lower frequencies and decreasing $C_o$ moves it to higher frequencies.

Figure 2:
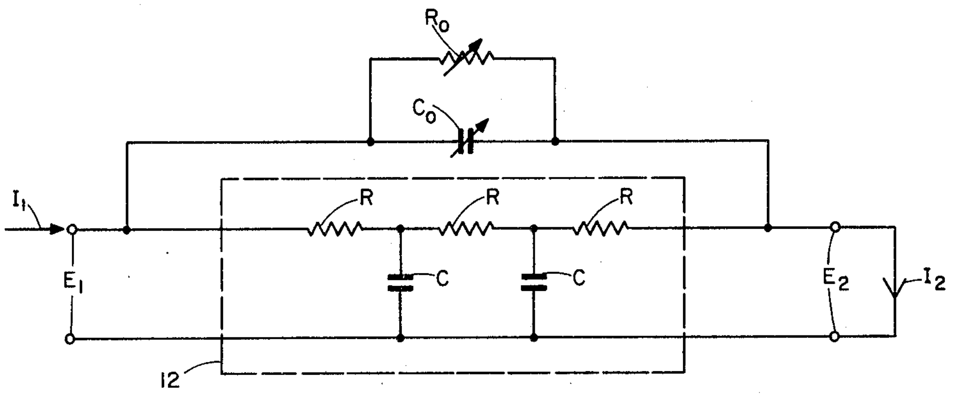
FIGURE 2 is a schematic drawing of the preferred passive RC network.
Figure 3:
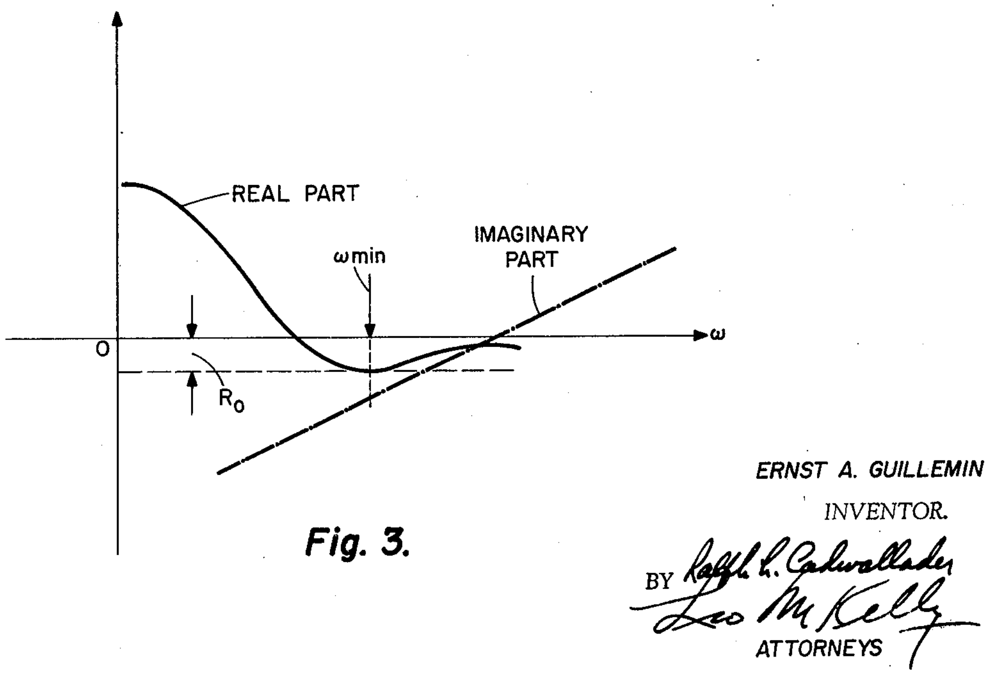
FIGURE 3 is a graph plotting the real and imaginary parts of the transfer admittance of the network within the dotted lines 12 of FIGURE 2 against frequency.

In FIGURE 3, the real part of the transfer admittance of the network within the dotted lines 12 of FIGURE 2, is plotted against frequency. It will be noted that at the frequency $\omega_{min.}$, a negative minimum occurs, which indicates that by bridging this portion of the network with an appropriate resistance $R_o$, the value at $\omega_{min.}$ can be raised to zero. It will be noticed that this zero is of double order which means that not only the real part but also its derivative (slope) with respect to frequency is zero at this point, where it turns out that the imaginary part is negative so that it can be cancelled by a bridged capacitance $C_o$ in parallel with $R_o$. The $j$-axis zero resulting from this set of circumstances has the property that small variations in $R_o$ move the zero in a direction normal to the $j$-axis while small variations in $C_o$ move it along the $j$-axis. This result is a very significant part of the invention since it makes the network easily tunable regarding the exact position of the desired transfer-function zero.

Thus, by means of small changes in the parameters $R_o$ and $C_o$ in the circuit of FIGURE 2, we can shift the transmission zero by small amounts in either direction. The circuit can have a $j$-axis zero or one in the right or left half-plane; and the frequency is tunable so that fine adjustments can readily be made. As mentioned above, this is a very important feature of my invention. It means that within a range of approximately 10% of the characteristic frequency, the network may be tuned to precise stable values. By so designing our network that the portion shown within the dotted lines 12 of FIGURE 2 is a single unit, it may be sealed in epoxy, enclosed in a container or even made a part of a printed circuit. It can now be a building block and with the selection of an appropriate $R_o$ and $C_o$, it may be used in many applications within its own range.

From a manufacturing point of view, the significance of this result resides in the fact that it can be produced in quantity and held for different applications as it may be needed.

Another important consequence of having a pair of "external" fine-tune adjustments $R_o$ and $C_o$, is that it is no longer necessary to construct the network from the highest-precision, most accurate and most expensive components. Now good production-quality components will suffice because minor errors can be tuned out by means of $R_o$ and $C_o$ after the network is constructed. This does not mean that these components can be selected carelessly. On the contrary, there is a great reward to be realized from exercising care in their selection. In this regard, it should be remembered that although the less-expensive, production-quality components have a plus-or-minus 10% variation in value, they can be separated into smaller groups in which they have a ratio to each other which is constant within the order of $\pm 0.2\%$. The resulting tracking of the components under changing temperature or voltage is then very uniform among the components. It is not difficult to get average variations in tracking of the order of 0.02%.

Where sufficient accuracy in tracking cannot be obtained, it is significant to observe that components are available having opposite temperature coefficients. It has been found that pairs of similar components having opposite temperature coefficients could be disposed as a pair in a balanced network. For example, the two capacitors C in FIGURE 2 are such a pair, and if they have opposite temperature coefficients, the results of changes in temperature tend to be cancelled and the effect thereof on the network response is greatly diminished. A similar effect would be gained by so selecting the R components. This beneficial effect is also realized by choosing $C_o$ with the opposite coefficient from that of the two C's in the circuit. Similarly, the $R_o$ may be opposite to the R's and thus provide the same advantage.

Figure 4:
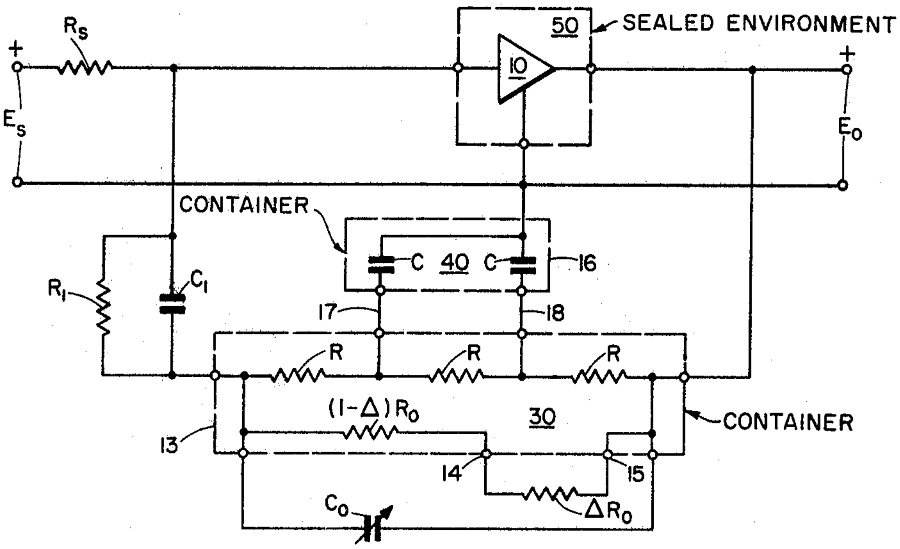
FIGURE 4 is a detailed schematic drawing of the preferred active filter constructed according to the principles of this invention.

My invention makes use of these characteristics which are often found in batches of components. In the circuit of FIGURE 4, each resistor R has the same value. It is important that they be the same but they need not be precisely a predetermined value. Thus, groups of components can readily be tested by well-known means and the components separated into individual groups having substantially identical characteristics. By so doing, an excellent level of precision can be obtained from production-quality components.

An important practical consideration of the network of FIGURE 1 is its stability. Although the operational amplifier 10 theoretically has an infinite gain when it is first turned on, the gain rises from a zero value at a finite rate which may be quite large but nevertheless is finite. The circuit, as a whole, must be stable with variation in gain or it could lock into an unstable oscillatory condition and never reach the desired final response pattern.

As the gain increases from zero toward infinity, the roots describe a variable gain locus which must be wholly contained in the left half-plane. It is desirable to have the locus terminate upon the $j$-axis and do so at right angles because, for a large finite gain, the resonance frequency is then essentially independent of the gain. This is especially true of we are using an amplifier that does not have an extremely high gain, for then there may be noticeable changes in gain which affect the position of the resulting poles near the $j$-axis and the resonant frequency of the pole pair.

My study has shown that the loci do not meet the $j$-axis at right angles unless the source resistance $R_s$ is zero, which is an impractical value. However, right angle incidence can be attained by connecting in series at the input of the passive RC circuit, a parallel combination of resistance and capacitance with appropriate values. Such a circuit is shown in FIGURE 4 where a parallel combination of $C_1$ and $R_1$ is added at the input of the circuit of FIGURE 2.

The dotted lines in FIGURE 4 indicate a division of the circuit into subassemblies with the variable elements disposed outside to permit easy access for tuning and adjusting. Such a division permits each subassembly to be constructed as a subminiature element thus greatly enhancing the number of applications for this invention.

The dotted lines 13 in FIGURE 4 enclose the resistive components R of the network. Each R is the same value resistance taken from a production quality group having low ratio and tracking percentages. As previously pointed out, extending outwardly from dotted lines 13 are terminals 14 and 15 between which $\Delta R_0$, a variable tuning resistor is connected. Thus, the components within dotted lines 13 may be a subminiature chip or any other self contained unit.

Dotted lines 16 are also enclosing a combination of components, in this case capacitors C which are preferably of similar quality to the resistors R. Terminals 17 and 18 permit interconnection between the resistive and capacitive circuits. The third self-contained unit is the operational amplifier 10.

Each of the three subassemblies, enclosed within dotted lines, is produceable as a subminiature chip. Thus three chips, a resistive chip 30, a capacitive chip 40 and an operational amplifier chip 50 may readily be assembled with terminals available for interconnecting the chips with the tuning components $\Delta R_0$, $C_0$, $R_1$, $C_1$ and $R_s$.

By selecting the proper values for resistors R, it is only necessary to have four different resistive chips 30 available for individual use to cover the frequency range from DC to 100 kc. Then, only 8 chips 40 in combination with the four chips 30 would yield 1020 distinct frequencies. Thus, it becomes evident that subminiature chips can be produced in volume and stored for later use in great quantity.

Although I have described my invention in some degree of particularity with respect to its preferred embodiment, its principle may be utilized in many forms. In this connection special mention may be made of the fact that all of the previously mentioned relationships regarding admittances may alternately be regarded as pertaining to impedance functions where we imply that the associated circuit topology is replaced by its dual in a sense that is well understood in the network art. For example, the circuit of FIGURE 2 is replaced by that shown in FIGURE 5. The basic RC ladder network within the dotted lines 12' here consists of series C's and shunt R's instead of series R's and shunt C's as in FIGURE 2. Correspondingly, the tuning elements $R_0$ and $C_0$ are connected in series at the base instead of being bridged across the top. The transfer impedance of this network apart from the elements $R_0$ and $C_0$ has a real part as shown in FIGURE 3 and an imaginary part that is positive in the vicinity of $\omega_{min.}$ so that it can be cancelled by the reactance of a series capacitance. The resultant RC network in FIGURE 5 then has a $j$-axis transmission zero for suitably chosen values of $R_0$ and $C_0$ and it is tunable by means of variations in these elements precisely as described above for the network of FIGURE 2.

Figure 5:
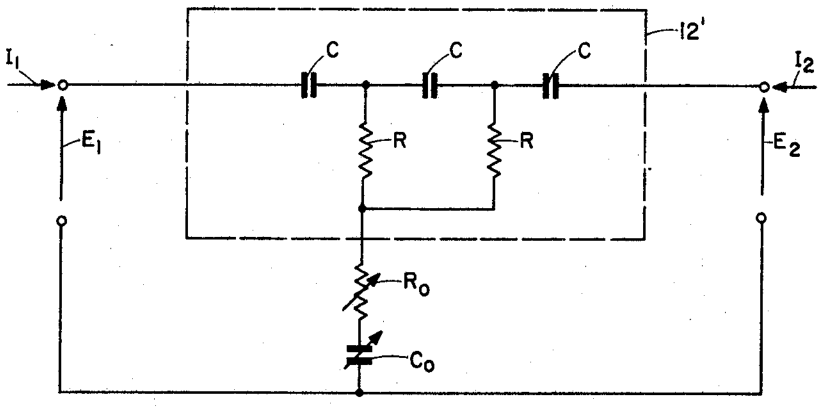
FIGURE 5 is a schematic drawing of another passive RC circuit.

We sometimes refer to the design of FIGURE 5 as being done on an impedance basis whereas that in FIGURE 2 is done on an admittance basis. All the properties of admittance functions pertaining to the latter apply to the corresponding impedance functions of the former. Just as the variable-gain locus of the filter on an admittance basis can be made to intersect the $j$-axis at right angles by connecting an appropriate parallel RC circuit in series at the input terminals (FIGURE 4) so can the form of a similar locus on an impedance basis be adjusted by connecting a series RC circuit in parallel at the input terminals in FIGURE 5. The circuit topologies in the two cases are duel as are those in FIGURES 2 and 5. Practical considerations usually influence the choice made between these two design bases, among such factors being the element values which for a normalization of R=1 are reciprocal.

To illustrate this reciprocal relationship and to provide an example of how values are selected for the various elements of FIGURES 2 and 5, the following table has been prepared.

TABLE A

| Relationship | FIGURE 2 | FIGURE 5 |
|---|---|---|
| RC | 3.15 | $\frac{1}{3.15}$ |
| $\frac{R_0}{R}$ | 30 | $\frac{1}{30}$ |
| $RC_0$ | $\frac{1}{16.4}$ | 16.4 |

Resistance and capacitance is given in ohms and farads respectively. Since there are three constants for four variables, one, preferably R, may be made equal to unity and thus all the other variables are immediately known for $\omega_0$ which is one radian per sec. The value of resistors R is independent of frequency but the value of capacitors C varies therewith. Thus, to select any particular frequency, it is only necessary to scale the C values accordingly. In so doing, the designer may wish to change certain values for convenience which he may do by employing the relationships set out in Table A. The designer may choose between the network of FIGURE 2 which is based on a transfer admittance and that of FIGURE 5 directed to a transfer impedance.

Other modifications and designs will occur to those skilled in this art and all such are deemed to fall within the spirit and scope of my invention:

I claim:

1. An active filter network comprising:

an amplifier having an input and an output;

a resistance-capacitance ladder network coupling said output to said input having a transfer function whose real part has a negative minimum at a particular frequency; and a separate resistance-capacitance circuit coupled to said network for raising said negative minimum to zero.

2. An active filter network as in claim 1 in which said transfer function has a non-zero imaginary part at said particular frequency and said separate resistance-capacitance circuit includes a variable capacitor for cancelling said imaginary part to zero.

3. An active filter network as claimed in claim 2 in which said means for raising the negative real minimum to zero is a variable resistor in said separate circuit connected in circuit with said resistance-capacitance network.

4. An active filter network as claimed in claim 3 in which the resistance components of said resistance-capacitance network are enclosed in a container, and in which at least part of said variable resistor is disposed outside said container.

5. An active filter network as claimed in claim 2, in which the capacitance components of said resistance-capacitance network are enclosed in a container, and in which at least part of said variable capacitor is disposed outside said container.

6. An active filter network as claimed in claim 2 in which said amplifier is an operational amplifier.

7. An active filter network as claimed in claim 6 in which said operational amplifier is enclosed in a sealed environment.

8. An active filter network as claimed in claim 2 in which said transfer function is a transfer admittance and the means for raising said negative real part to zero and cancelling the imaginary part to zero in said separate circuit are added resistance and capacitance respectively bridging said resistance-capacitance network.

9. An active filter network as claimed in claim 8 in which the real part of the transfer admittance of said resistance-capacitance network is nominally zero at said particular frequency and small changes in the value of said bridging resistor change only said real part of the transfer admittance.

10. An active filter network as claimed in claim 8 in which the imaginary part of the transfer admittance of said resistance capacitance network is nominally zero at said particular frequency and small changes in the value of said bridging capacitance change only said imaginary part of said transfer admittance.

11. An active filter network as claimed in claim 10 in which the resistance-capacitance network and the bridging resistance and capacitance have a transfer admittance which is nominally zero at said particular frequency and is orthogonally tunable within a small region of the complex frequency plane in the vicinity of the said particular frequency point by relatively small variations in the values of said bridging resistance and capacitance.

12. An active filter network as claimed in claim 8 in which said resistance-capacitance network is in the form of an unbalanced ladder with substantially equal series resistance and substantially equal shunt capacitances.

13. An active filter network as claimed in claim 12 in which a second resistance-capacitance network is connected in series with the said resistance-capacitance network to cause the variable-gain locus of the filter network to meet the *j*-axis on the complex frequency plane of said transfer admittance at right angles.

14. An active filter network as claimed in claim 2 in which said transfer function is a transfer impedance and the means for cancelling said real and imaginary parts to zero in said separate circuit are added resistance and capacitance respectively connected in series with shunt elements of said ladder network.

15. An active filter network as claimed in claim 14 in which small changes in the value of the added series resistance change only the real part of the transfer impedance which is nominally zero at said particular frequency.

16. An active filter network as claimed in claim 14 in which small changes in the value of the added series capacitance change only the imaginary part of the transfer impedance which is nominally zero at said particular frequency.

17. An active filter network as claimed in claim 16 in which the resistance-capacitance network and the series added resistance and capacitance have a transfer impedance which is nominally zero at said particular frequency and is orthogonally tunable within a small region of the complex frequency plane in the vicinity of the said particular frequency point by relatively small variations in the values of said series added resistance and capacitance.

18. An active filter network as claimed in claim 14 in which said resistance-capacitance network is in the form of an unbalanced ladder with substantially equal series capacitances and substantially equal shunt resistances.

19. An active filter network as claimed in claim 18 in which a second resistance-capacitance network is connected in series with said resistance-capacitance network to cause the variable-gain locus of the filter network to meet the *j*-axis on the complex frequency plane of said transfer impedance at right angles.

20. An active filter network comprising:

an amplifier having an input and an output;

a resistance-capacitance ladder network coupling said output to said input having a transfer function whose real part has a negative minimum and whose imaginary part is non-zero at a particular frequency; and a separate resistance-capacitance circuit coupled to said network and having a variable resistor and a variable capacitor constituting means for shifting the transmission zero of said transfer function normal to and along the *j*-axis, respectively, of the complex frequency plane in the vicinity of said particular frequency.

21. An active filter network as claimed in claim 20 in which said transfer function is a transfer admittance and said separate resistance-capacitance circuit bridges said ladder network.

22. An active filter network as claimed in claim 20 in which said transfer function is a transfer impedance and said variable resistor and variable capacitor are connected in series between one side of the ladder network and ground.

23. An active filter network as claimed in claim 20 in which said ladder network is enclosed and at least portions of said variable resistor and variable capacitor are exposed for adjustment.

References Cited

UNITED STATES PATENTS

| | | | |
|---|---|---|---|
| 2,298,177 | 10/1942 | Scott. | |
| 3,356,962 | 12/1967 | Morgan | 330—109 X |

ROY LAKE, Primary Examiner

J. B. MULLINS, Assistant Examiner

U.S. Cl. X.R.

330—109